United States Patent [19]

Etherton

[11] 3,723,211

[45] Mar. 27, 1973

[54] PREPARATION OF LAYOUT SHEETS FOR PRINTED WIRING

[75] Inventor: Ivor Howard Etherton, Sutton Coldfield, England

[73] Assignee: Joseph Lucas (Industries)Limited, Birmingham, England

[22] Filed: Feb. 16, 1971

[21] Appl. No.: 115,645

[30] Foreign Application Priority Data

Feb. 17, 1970 Great Britain........................7,482/70

[52] U.S. Cl. ........................156/63, 156/297, 161/6, 161/39, 161/413

[51] Int. Cl. ............................................B32b 31/00

[58] Field of Search ......156/63, 277, 62, 297; 161/6, 161/39, 413; 117/12; 101/34; 96/27, 43, 44

[56] References Cited

UNITED STATES PATENTS

| | | | |
|---|---|---|---|
| 2,561,672 | 7/1951 | Pritikin | 161/6 X |
| 3,154,458 | 10/1964 | Mulla | 156/304 X |
| 3,240,642 | 3/1966 | Gaudio | 156/89 |
| 3,284,941 | 11/1966 | Kaup | 156/303.1 X |
| 3,573,455 | 4/1971 | Suierveld | 156/64 X |

FOREIGN PATENTS OR APPLICATIONS

| | | | |
|---|---|---|---|
| 368,629 | 5/1963 | Switzerland | 156/62 |

*Primary Examiner*—William A. Powell
*Attorney*—Holman & Stern

[57] ABSTRACT

A method of preparing master layout sheets for multilayer printed wiring includes laying transparent sheets over a guide layout marked with a grid and applying opaque material to selected areas of the sheets. The grid may include additional lines and areas which correspond to some of the required opaque areas on the sheets. The transparent sheets may be prepared with some of said areas before being laid over the guide layout.

18 Claims, 8 Drawing Figures

INVENTOR

Ivor Howard Etherton

ATTORNEYS

INVENTOR
Ivor Howard Etherton
ATTORNEYS

INVENTOR
Ivor Howard Edwards
ATTORNEYS

INVENTOR
Ivor Howard Eckerton
ATTORNEYS

INVENTOR
Ivor Howard Etherton
ATTORNEYS

INVENTOR
Ivor Howard Atherton
ATTORNEYS

PREPARATION OF LAYOUT SHEETS FOR PRINTED WIRING

This invention relates to a method for preparing master layout sheets for printed wiring arrangements and has as an object to provide a convenient method for this purpose.

According to the invention a method of preparing a set of master layout sheets for a printed wiring arrangement of the kind in which a pair of conductor patterns are separated by an insulating layer and in which conductors in one of the patterns are conductively connected through the insulating layer to conductors in the other of the patterns includes the steps of applying to a first and second translucent or transparent sheet, upon each of which there is plurality of opaque areas whose positions correspond to the intersections of the lines on a substantially square reference grid, a series of lines of opaque material which lie substantially parallel to the lines on the said grid, the lines on each said sheet respectively corresponding to the conductors in the said patterns, and applying to a third sheet which has the greater part of its area opaque, but which is formed with transparent areas whose locations correspond to the intersections of the lines on the said grid, an opaque material so as to leave selected ones of the transparent areas at locations which correspond to the locations of the connections through the insulating layer of the wiring arrangement.

An example of a method according to the invention will now be described with reference to the accompanying drawings in which.

Figure 3:
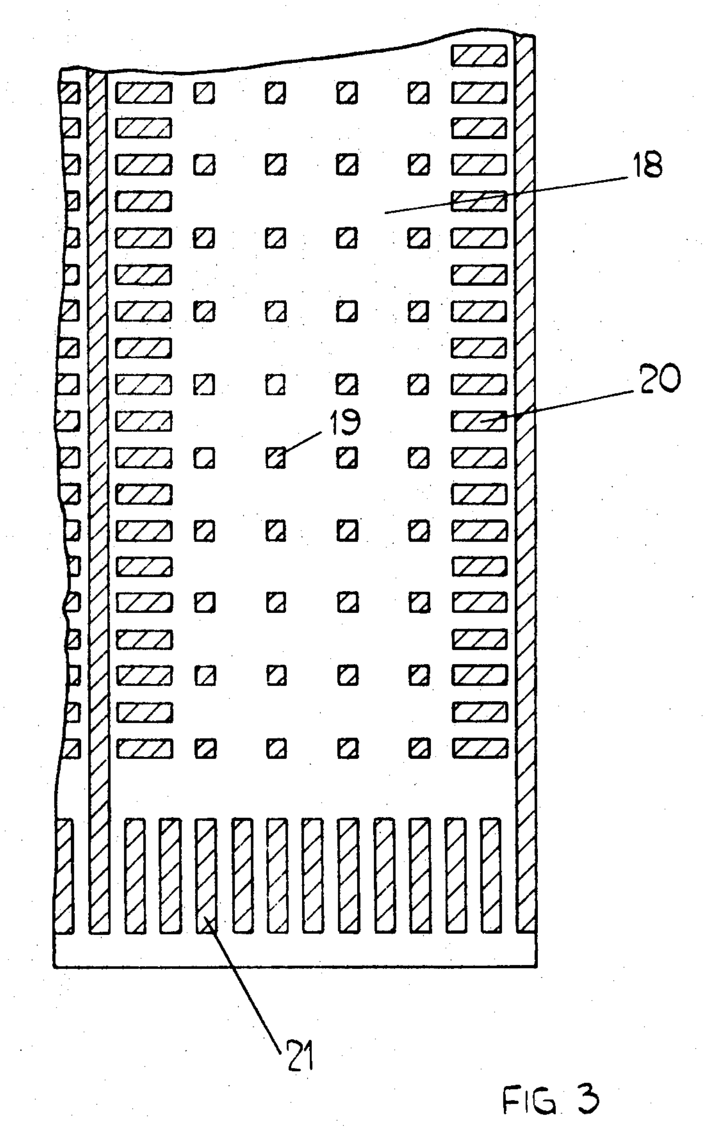
Figure 4:
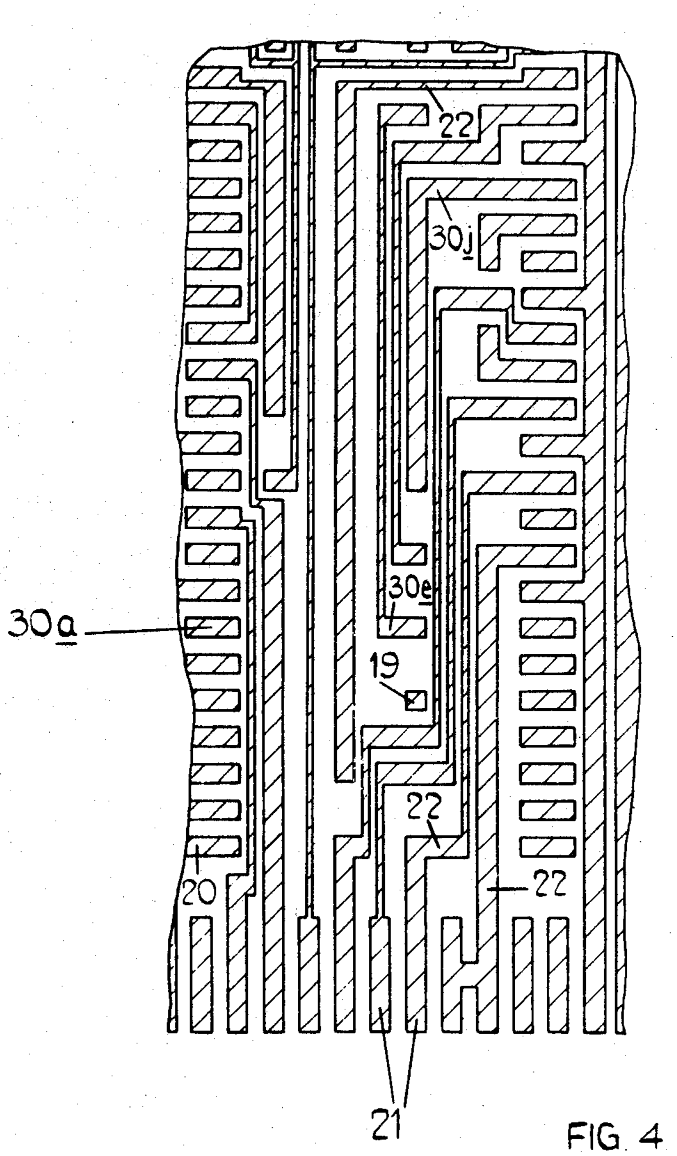
Figure 5:
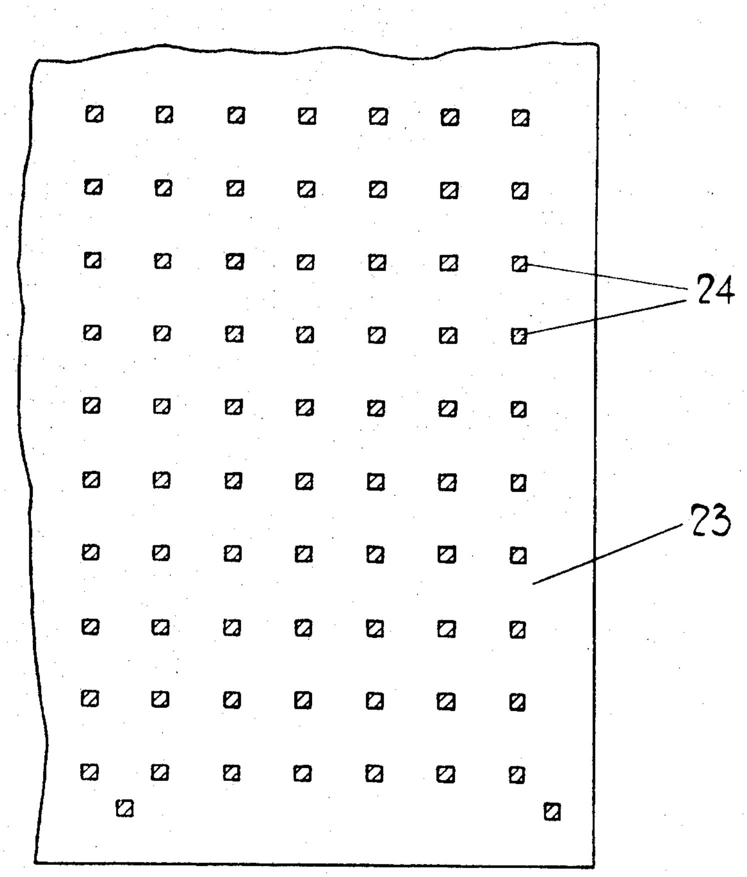
Figures 6, 7:
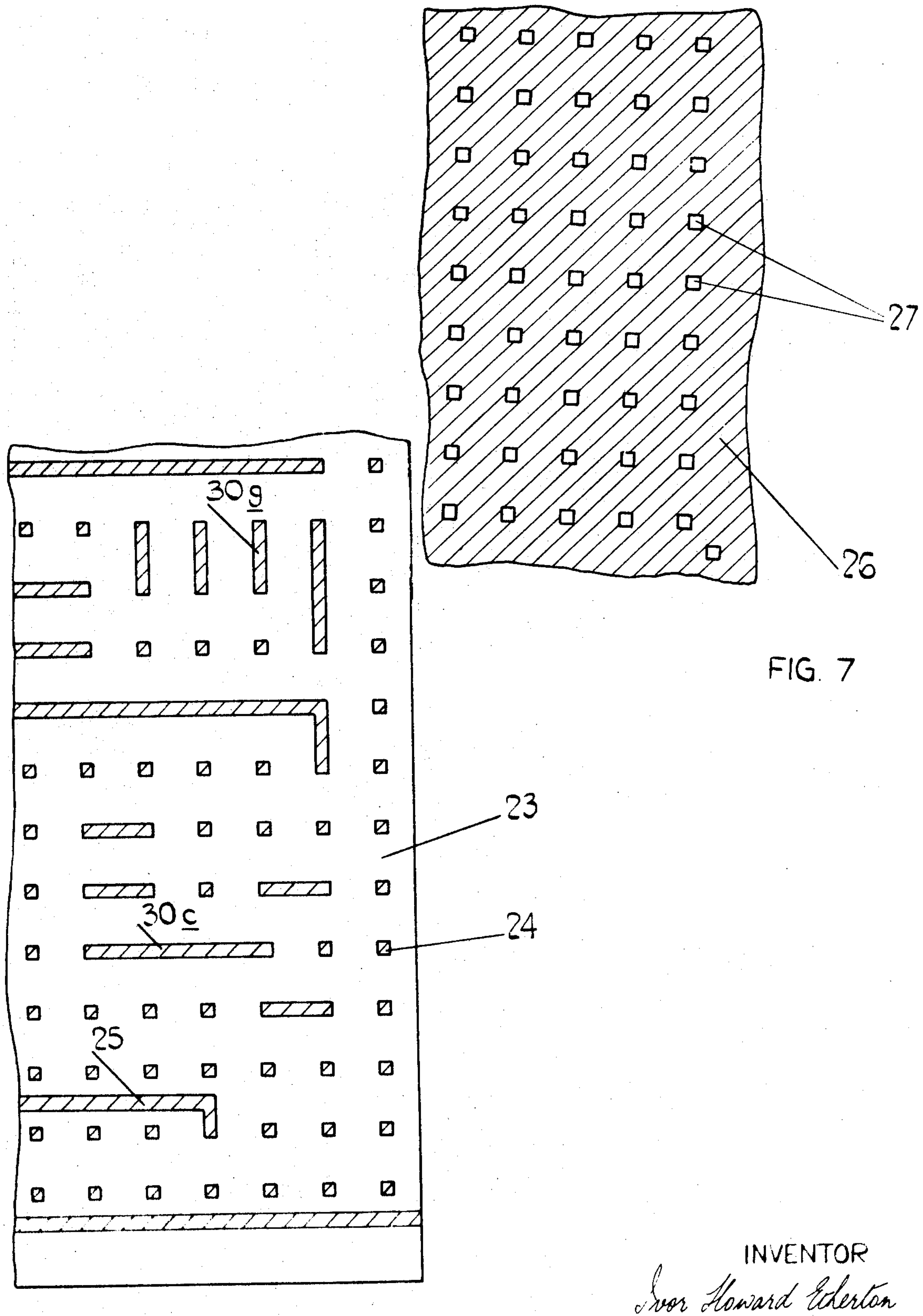
Figure 8:
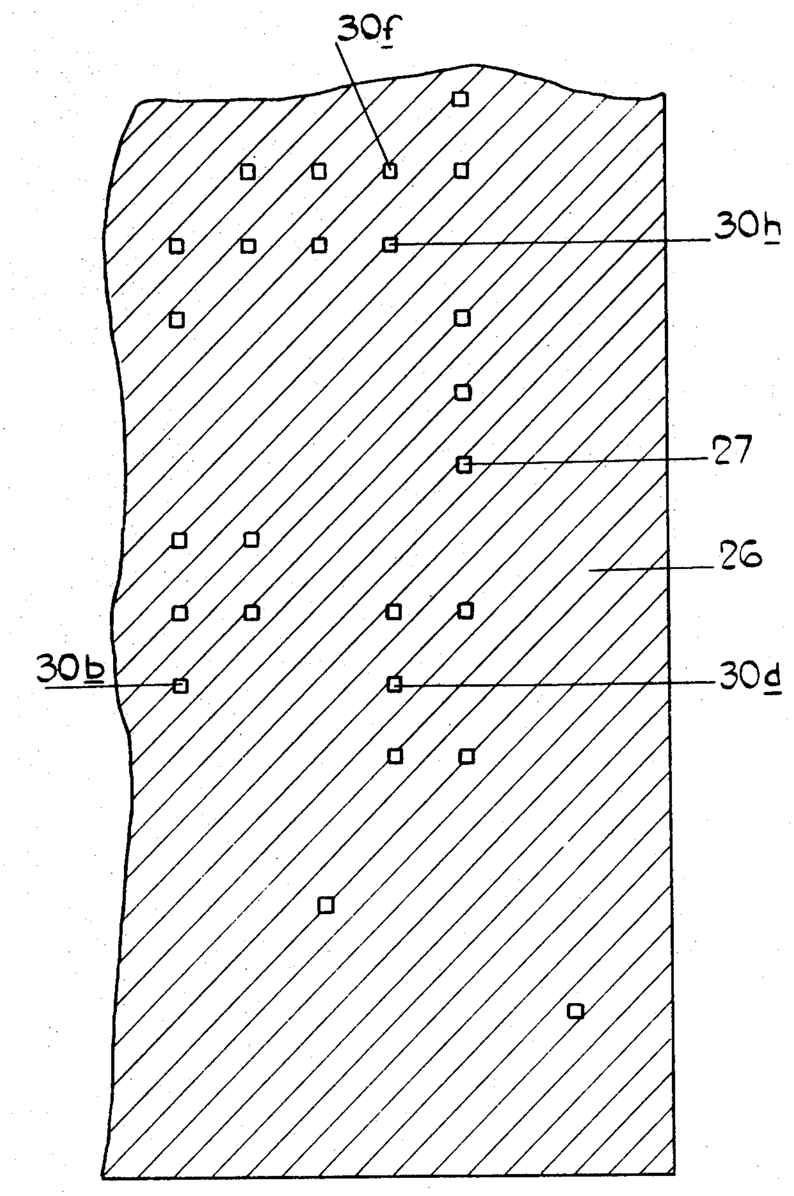

FIGS. 3 and 4 show stages in the preparation of part of a layout sheet for the said one conductor pattern, FIGS. 5 and 6 show stages on the preparation of part of a layout sheet for the other conductor pattern, and FIGS. 7 and 8 show stages in the preparation of a third layout sheet.

Figure 1:
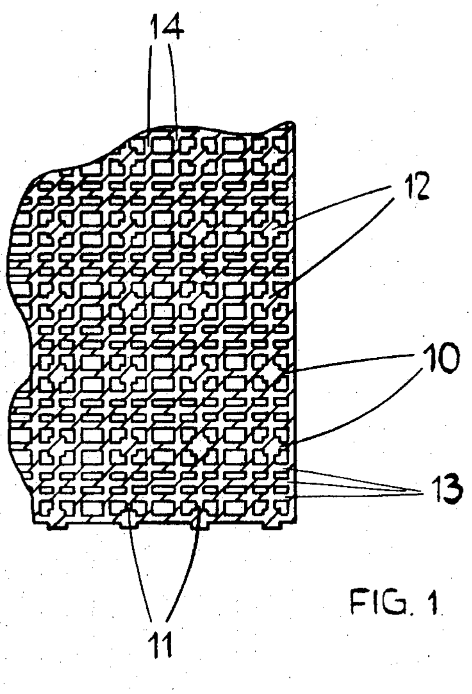
FIG. 1 shows part of a reference grid.

The reference grid shown in FIG. 1 comprises a first series of equi-spaced parallel lines 10 each of which is intersected at right angles by a second series of equi-spaced parallel lines 11 to define a square grid. A square marker 12 is sited at each intersection. Additional series of lines 13, 14 are respectively interposed between the lines 10, 11 and are parallel thereto. The spacing of the markers 12 corresponds to the spacing of the connections required to be made to a printed wiring arrangement ultimately to be produced.

Figure 2:
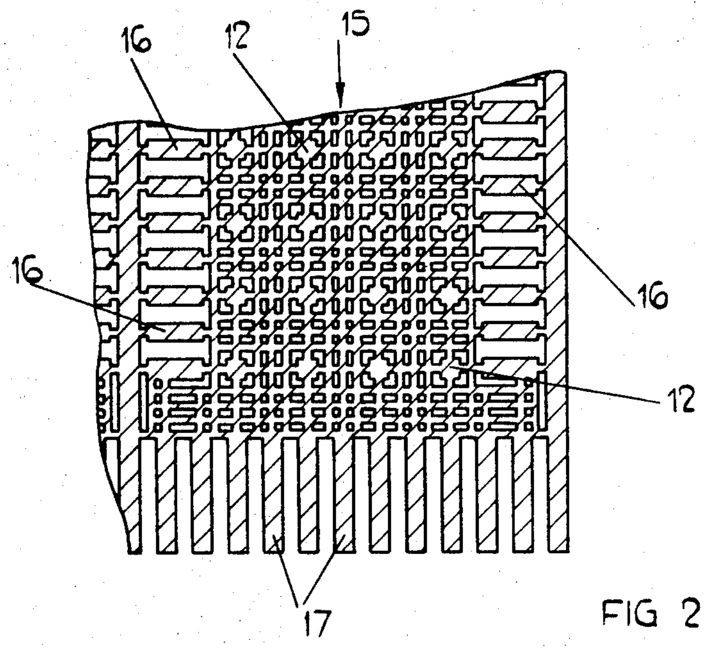
FIG. 2 shows part of a guide layout for one of the conductor patterns.

The guidelayout shown in FIG. 2 is intended for a specific type of printed wiring arrangement and has areas 15 which are prepared as a grid identical to the reference grid shown in FIG. 1. There are provided upon the guide layout rectangular areas 16 which are aligned with the markers 12 on the grid area 15. Additional rectangular areas 17 are also provided, aligned with the markers 12 and also at intermediate locations. The positions of the areas 16, 17 correspond to the required locations of terminals on the printed wiring arrangement.

FIG. 3 shows part of a transparent sheet 18 having formed thereon opaque areas 19, 20, 21 which respectively correspond in dimensions and locations to the markers 12 and areas 16, 17 previously described. Sheet 18 is produced by a photographic or similar process and forms the basis of one of the master layout sheets for the printed wiring. An opaque material, preferably an adhesive tape, is applied as shown in FIG. 4 to form strips 22 upon the sheet 18. The strips 22 are of varying widths and have forms and positions which correspond to the arrangement of one of the conductor patterns of the printed wiring arrangement. When all the required strips 22 have been applied, sheet 18 forms one of the required master layout sheets. In order to facilitate application of the strips 22 the sheet 18 may be laid over the guide layout shown in FIG. 2 so that the areas 19 and markers 12 are in register. The lines 10, 11, 13, 14 of the grid areas 15 are then used as guides to maintain the strips 22 straight and parallel.

Trial arrangements may be sketched, for example in chinagraph pencil, on the sheet 18. Such a trial arrangement may itself be used as a guide for the application of strips 22 to a further sheet 18. Alternatively, a reproduction may be made on paper, or other suitable material, of the layout shown in FIG. 3. Trial arrangements of the strips 22 may then be sketched upon the reproduction.

FIG. 5 shows part of a transparent sheet 23 formed with opaque squares 24 at positions which correspond to the positions of the markers 12 on the grid of FIG. 1. Opaque strips 25, as shown in FIG. 6, are applied to the sheet 23 at locations corresponding to the arrangement of the other of the conductor patters of the printed wiring arrangement. On completion sheet 23 forms another of the master layout sheets. Preparation of sheet 23 may be assisted by any of the methods previously described with reference to sheet 18.

FIG. 7 shows part of a sheet 26 which is generally opaque but which is formed with transparent areas 27. Areas 27 correspond in dimensions and location to the markers 12 of the reference grid of FIG. 1. Opaque material is applied to the sheet 26 so as to leave, as shown in FIG. 8, selected ones of the areas 27 at locations which correspond to the required interconnections between the two conductor patterns of the printed wiring arrangement. On completion sheet 26 forms the third of the required master layout sheets.

Preparation of the sheet 26 may be assisted by any of the methods previously described. Additionally, during preparation any or all of the sheets may be laid one over the other to assist in determining the conductor paths of the printed wiring arrangement. The path of a typical combination of conductors may be seen in FIGS. 4, 6 and 8, in which a conductor **30*a* is shown connected to a conductor 30*j* via intermediate connections 30*b* to 30*h*** inclusive.

It will be understood that the master layouts produced by the method described are preferably to an enlarged scale, and are subjected to photographic reduction prior to use in the production of printed wiring.

The master layouts described are intended for use in applying a succession of layers of conductor patterns to one side of a supporting base, the layer corresponding to FIG. 4 being insulated from the layer corresponding to FIG. 6, except where connections are made as indicated by a layer corresponding to FIG. 8.

I claim:

1. A method of preparing a set of master layout sheets for a printed wiring arrangement of the kind in which a pair of conductor patterns are separated by an insulating layer and in which conductors in one of the patterns are conductively connected through the insulating layer to conductors in the other of the patterns including the steps of applying to a first and second translucent or transparent sheet, upon each of which there is a plurality of opaque areas whose positions correspond to the intersections of the lines on a substantially square reference grid, a series of lines of opaque material which lie substantially parallel to the lines on the said grid, the lines on each said sheet respectively corresponding to the conductors in the said patterns, and applying to a third sheet which has the greater part of its area opaque, but which is formed with transparent areas whose locations correspond to the intersections of the lines on the said grid, an opaque material so as to leave selected ones of the transparent areas at locations which correspond to the locations of the connections through the insulating layer of the wiring arrangement.

2. A method as claimed in claim 1 in which said first sheet is laid over a guide layout sheet marked with lines which correspond to said square grid, said areas on said first sheet being placed in register with the intersections of the lines on the guide layout sheet.

3. A method as claimed in claim 1 in which said first sheet is laid over a guide layout sheet marked with lines which correspond to said square grid and with further lines in spaced parallel relationship with said grid lines, said areas on said first sheet being placed in register with the intersections of said grid lines on the guide layout sheet.

4. A method as claimed in claim 1 in which said first sheet is laid over a guide layout sheet marked with lines which correspond to said square grid, with further lines in spaced parallel relationship with said grid lines and with areas aligned with said grid lines and with selected ones of said further lines.

5. A method as claimed in claim 4 in which there are applied to said first sheet areas of opaque material which correspond to said areas on the guide layout sheet.

6. A method as claimed in claim 5 in which said areas on the first sheet corresponding to said areas on the guide layout sheet are applied prior to laying said first sheet over said guide layout sheet.

7. A method as claimed in claim 2 in which said opaque lines are applied to said first sheet so as to lie substantially parallel to said lines on the guide layout sheet.

8. A method as claimed in claim 7 in which said opaque lines are applied to said first sheet so that for the greater part of their lengths they overlie corresponding lines on the guide layout sheet.

9. A method as claimed in claim 1 in which said second sheet is laid over a guide layout sheet marked with lines which correspond to said square grid, said areas on said second sheet being placed in register with the intersections of the lines on the guide layout sheet.

10. A method as claimed in claim 1 in which said second sheet is laid over a guide layout sheet marked with lines which correspond to said square grid and with further lines in spaced parallel relationship with said grid lines, said areas on said second sheet being placed in register with the intersections of said grid lines on the guide layout sheet.

11. A method as claimed in claim 9 in which said opaque lines are applied to said second sheet so as to lie substantially parallel to said lines on said guide layout sheet.

12. A method as claimed in claim 11 in which said opaque lines are applied to said first sheet so that for the greater part of their lengths they overlie corresponding lines on the guide layout sheet.

13. A method as claimed in claim 1 which includes the step of preparing a trial layout on said first sheet.

14. A method as claimed in claim 1 which includes the step of preparing a trial layout on a reproduction of said first sheet.

15. A method as claimed in claim 1 which includes the step of preparing a trial layout on said second sheet.

16. A method as claimed in claim 1 which includes the step of preparing a trial layout on a reproduction of said second sheet.

17. A method as claimed in claim 1 in which any of said sheets is laid over any other of said sheets to assist in determining the positions on said first, second and third sheets to which said opaque material is to be applied.

18. A method as claimed in claim 1 in which said opaque material is applied by means of an adhesive.

* * * * *